United States Patent [19]

King, Sr.

[11] Patent Number: 4,890,640

[45] Date of Patent: Jan. 2, 1990

[54] DRAINAGE VALVE

[76] Inventor: Lloyd H. King, Sr., 5222 Green Farms Rd., Edina, Minn. 55436

[21] Appl. No.: 347,441

[22] Filed: May 8, 1989

Related U.S. Application Data

[63] Continuation-in-part of Ser. No. 215,397, Jul. 5, 1988, abandoned.

[51] Int. Cl.$^4$ .......................... F16K 15/14; E03B 7/08
[52] U.S. Cl. ............................ 137/512.4; 137/516.27; 137/517; 137/550; 137/843; 251/145; 251/368; 405/37; 405/44
[58] Field of Search ................ 137/236.1, 517, 516.25, 137/516.27, 843, 512.4, 550; 251/145, 368; 405/36, 37, 39, 43, 44

[56] References Cited

U.S. PATENT DOCUMENTS

| | | | |
|---|---|---|---|
| 218,024 | 7/1879 | Hennessy et al. | 137/517 |
| 3,143,135 | 8/1964 | Cornelius | 251/145 X |
| 3,456,683 | 7/1969 | Roulet et al. | 137/843 X |
| 3,999,570 | 12/1976 | Clements | 251/145 X |
| 4,244,378 | 1/1981 | Brignola | 137/843 X |

Primary Examiner—John Rivell
Attorney, Agent, or Firm—Jacobson and Johnson

[57] ABSTRACT

A drainage valve for use in pressure systems where pressure surges occur for draining an underground water system when the water pressure in the underground water system is off and for sealing the drainage valve against drainage when the water pressure is on comprising a housing having a first annular support and sealing surface and a second annular support and sealing surface for supporting a member that is nonextrudable through a drain passage in the drainage valve under normal operating pressures and surge pressures encountered in water supply systems and to permit said nonextrudable member to open said drain passage when the water pressure is off.

20 Claims, 3 Drawing Sheets

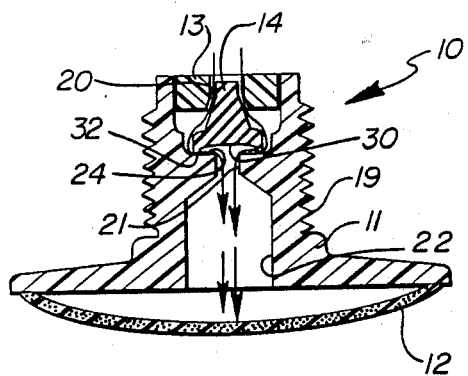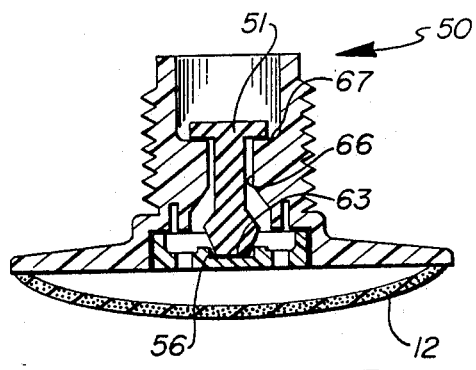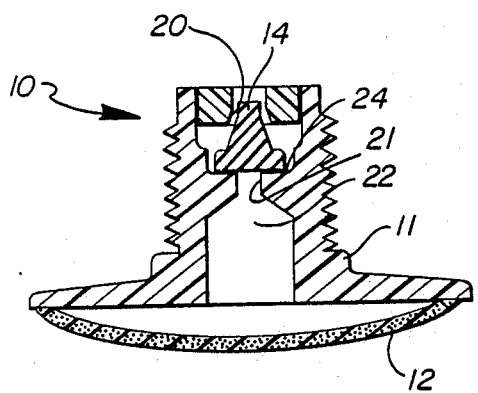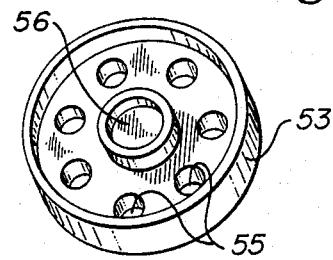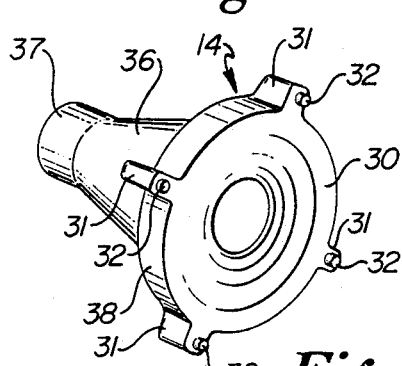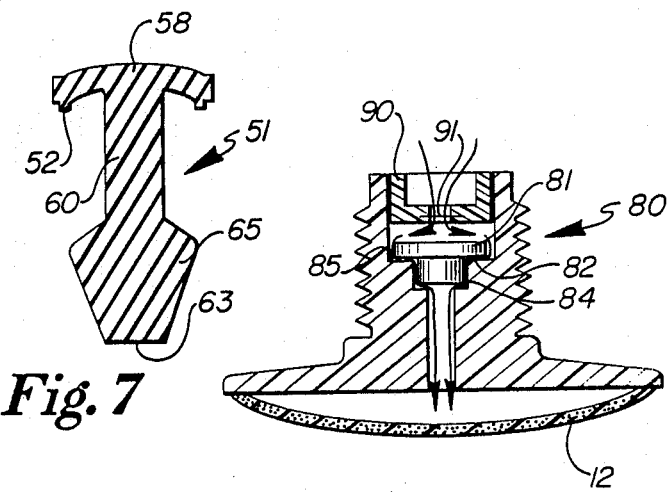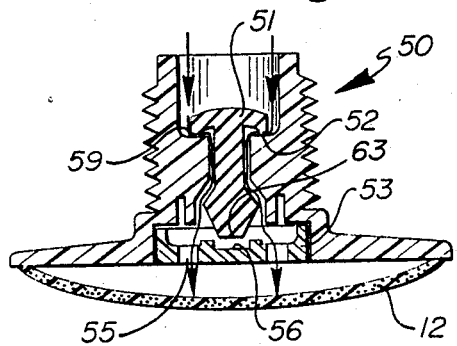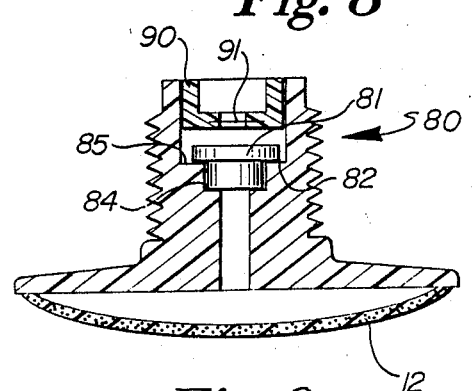

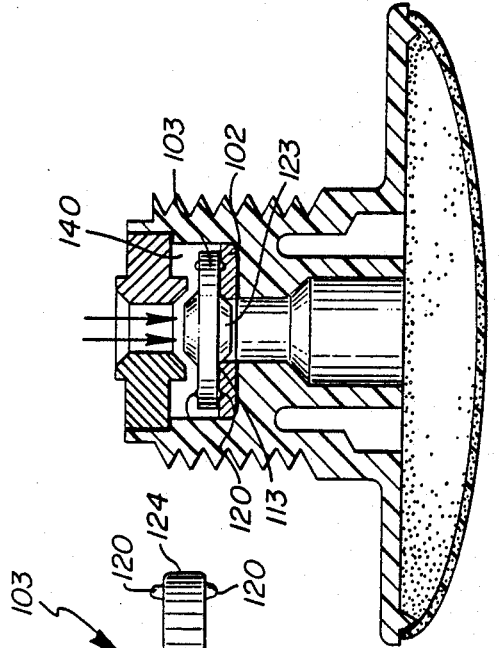
Fig. 10
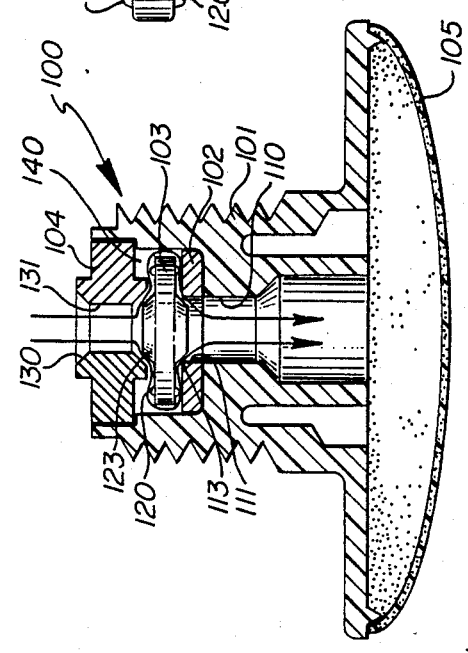
Fig. 13
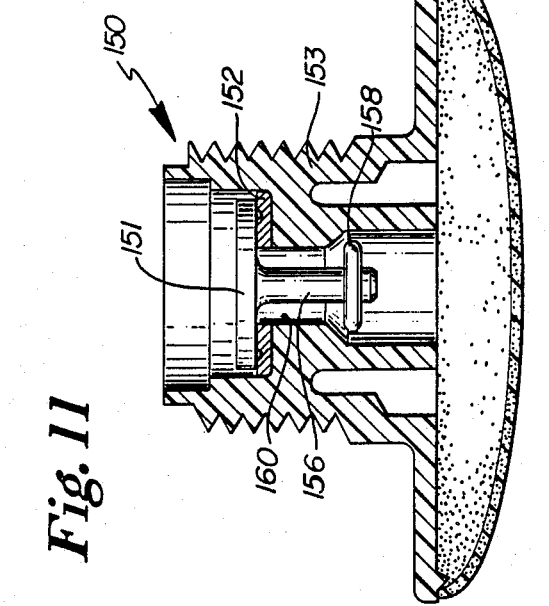
Fig. 11
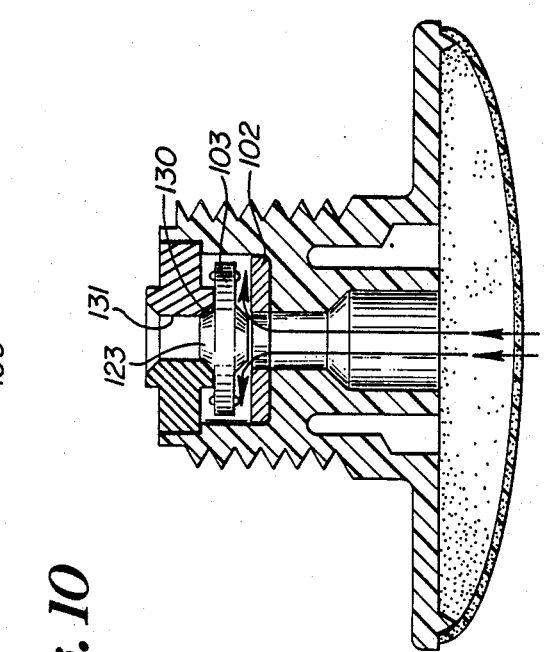
Fig. 12
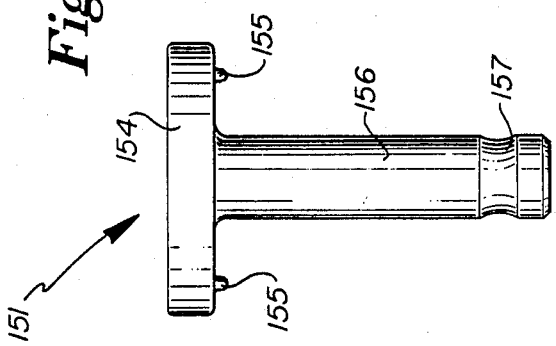
Fig. 14
Fig. 15

DRAINAGE VALVE

CROSS REFERENCE TO RELATED APPLICATIONS

This application is a continuation-in-part of my co-pending patent application titled Improved Drainage Valve, U.S. Ser. No. 215,397, filed July 5, 1988 now abandoned.

BACKGROUND OF THE INVENTION

1. Field of the Invention

This invention generally relates to drainage valves used in underground watering systems that when shut off, automatically drain the water from the drainage valve and the underground system to prevent damage due to freezing ground conditions and, more particularly, to drainage valves used in systems where the water supply is abruptly shut off.

2. Description of the Prior Art

My U.S. Pat. No. 3,779,276 shows a drainage valve for an underground watering system. The drainage valve includes a resilient valve member that prevents water from escaping from the underground water system under high line pressures but opens under lesser shutoff pressures to permit the water in the drainage valve and the underground water lines to drain into the soil. While my prior art drainage valve effectively drains the water from the system and prevents subsoil water from entering the line, the resilient valve member in my drainage valve may be blown out by high pressure water line surges occurring during shutoff. Typically, in most underground systems the water pressure fluctuates as valves are opened or closed. In a zone type system where an electro-mechanical valve is used to shut off the water supply, the rapidity of the closing action of the valve creates high pressure surges that may blow out the resilient valve member thereby rendering the drainage valve ineffective. Because the drainage valves are located underground, it may be some time before the faulty drainage valve is found and replaced. Usually the only way a faulty drainage valve can be discovered is to observe the area around the drainage valve to see if the ground is excessively wet. Since the systems are located underground and are not disturbed once installed, one of the difficulties is the inability of the user to determine that the system has a failure until the ground becomes saturated. My present invention solves the problem of resilient valve member blowout yet provides a drainage valve that functions to drain water from the valve while preventing subsoil water from entering the systems.

BRIEF SUMMARY OF THE INVENTION

Briefly, the present invention comprises a drainage valve having a nonextrudable sealing member having one section that is restrained from blowout by a support surface that prevents the nonextrudable member from being blown out the drainage valve under pressure line surges yet still permits the nonextrudable member to open and close the water passage in the drain valve in response to a change in water line pressure to permit normal draining or water supply.

BRIEF DESCRIPTION OF THE DRAWINGS

FIG. 1 is a sectional view of one embodiment of my invention in the drain mode;

FIG. 2 is a sectional view of the invention of FIG. 1 in the non-drain mode;

FIG. 3 shows the nonextrudable sealing member of the invention of FIG. 1;

FIG. 4 shows an alternate embodiment of my invention in the drain mode;

FIG. 5 shows the embodiment of FIG. 4 in the non-drain mode;

FIG. 6 shows a separate support surface for holding the end of nonextrudable sealing member;

FIG. 7 shows the nonextrudable sealing member of the invention of FIG. 4;

FIG. 8 shows a further alternate embodiment of the invention having a stepped nonextrudable sealing member in the drain mode;

FIG. 9 shows the invention of FIG. 8 in the non-drain mode;

FIG. 10 is a sectional view of the preferred embodiment of my invention in the drain mode;

FIG. 11 is a sectional view of the invention of FIG. 10 in the non-drain mode;

FIG. 12 shows the nonextrudable sealing member of the invention of FIG. 10 in the backflow sealing mode;

FIG. 13 shows an enlarged view of the nonextrudable sealing member of FIGS. 10, 11, and 12;

FIG. 14 is a sectional view of an alternate embodiment of my invention;

FIG. 15 shows the nonextrudable sealing member of FIG. 14;

DESCRIPTION OF THE PREFERRED EMBODIMENT

Figure 16:
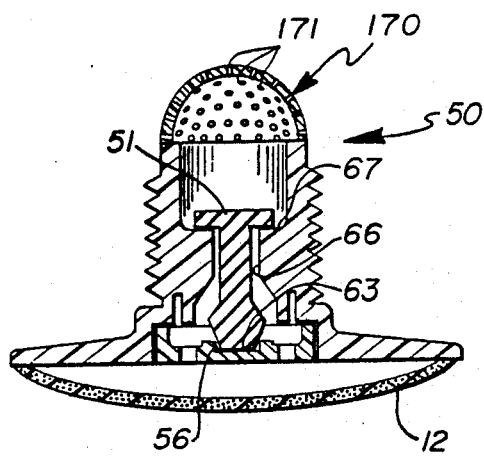
FIG. 16 shows a side section view of the embodiment of FIG. 5 with a domed screen over the inlet.

The drainage valves shown in the drawings provide a means to automatically drain the underground water supply pipes when the water supply is shut off. Draining the pipes prevents the pipes and drainage valve from freezing and rupturing during freezing conditions.

Referring to FIG. 1 reference numeral 10 identifies my improved drainage valve 10 having a nonextrudable sealing member comprising a resilient stopper plug 14 located in a housing 11 which connects to underground pipelines (not shown). Resilient stopper plug 14 is shown in greater detail in FIG. 3. Plug 14 has a general conical neck 36, a cylindrical top 37, and a cylindrical base 38 having four members 31 extending radially outward from base 38. Base 38 and neck 36 have sufficient thickness so that resilient plug 14 cannot be extruded through a drain passage or opening 21 under the pressure surges encountered in opening and closing a drain valve connected to a source of high pressure water. The sizing of the resilient plug to produce a nonextrudable member of resilient material can be determined by numerous factors including the water pressure, the type of material used to make plug 14, and the size of the opening in the drain valve. To provide the needed resiliency to cause the plug to retract from the sealing mode when the water supply pressure is removed, I provide at least a portion of resilient plug 14 with some means to produce retraction of the plug. Plug 14 is held in vertical alignment with drain passage 22 by a guide surface 20 located in the top of valve 10. The means to produce retraction of resilient plug 14 is provided by annular support surface 24 and resilient nipples 32 that are spaced from the more massive portion of resilient plug 14 that cannot be extruded through the opening 30. Located on each of members 31 is a resilient hemispherical shaped nipple 32. When the water pressure is shut off nipples 32 pushes resilient plug 14 upward and then hold bottom sealing surface 30 away from annular seat or surface support 24 in drainage valve 10 in the drain mode.

FIG. 1 illustrates drainage valve 10 in the drain mode or up position with sealing surface 30 spaced from annular support surface 24 in housing 11. With the water supply shut off, the resiliency of plug 14 and the resiliency of nipples 32 holds plug 14 in the up position to permit the water to drain around and under plug 14, through passages 21 and 22 and eventually into the ground through a porous drainage pad 12. The arrows in FIG. 1 show the path the water follows as it drains through pad 12. Pad 12 keeps soil particles from entering drainage valve 10 and allows the water to drain into the ground. Typically, pad 12 may be made from a material such as dacron or the like and is shown in my U.S. patent 4,317,471.

FIG. 2 illustrates the improved drain valve in the non-drain mode or high pressure position. Plug 14 is shown seated on annular seat or support surface 24 in housing 11. When the underground sprinkling system is on (non drain mode) the water pressure acting on top of plug 14 firmly forces and holds plug 14 in sealing position on support surface 24 to seal off passages 21 and 22 prevent water from draining out of valve 10 and into the surrounding subsoil. Thus in the non-drain mode the underground sprinkler system directs water to the sprinkler heads which spray water over the lawn.

It has been discovered that occasionally when the water pressure is turned on pressure surges may occur that blow out the resilient valve member in my prior art drainage valve shown in U.S. Pat. No. 3,779,276 resulting in the drainage valve discharging water into the ground when the drainage valve should be in the non drain mode or closed condition. My prior art drain valve includes a resilient head that flexes to retract the drain valve member when the water pressure is shut off with nipples to hold the resilient head off the sealing surface once the resilient head has flexed to retract the drain valve member.

The present invention eliminates the problem of the resilient plug 14 being blown out by using an annular support surface 24 to support at least a portion of the more massive portion of the resilient plug 14 during conditions when pressure surges occur. By placing the support surface adjacent the more massive portion of the resilient plug I minimize the amount of deformation of the plug and thus minimize the opportunity for the resilient plug to be blown out. By placing the resilient nipples as a separate portion of the resilient plug I provide a plug that still has sufficient resiliency to retract when the water pressure is shut off.

Located in the top portion of housing 11 and on the upstream side of plug 14 is an annular stop 13 having a cylindrical guide surface 20 that forms a fluid passage and also confines plug 14 to vertical displacement along cylindrical guide surfaces passage. The guide surface 20 permits plug 14 to move vertically up and down in response to fluid pressure at the inlet of drainage valve 10 by guiding plug surfaces 36 and 37 along guide surface 20. By having the plug guide surfaces on the top I can place the bulkier or more massive portion of resilient plug 14 for support by annular support surface 24. By having the more massive portion of plug 14 on support surface 24 I can minimize the inherent resilient deformation that may result in plug 14 being blown out of my drainage valve yet still permit the resiliency of plug 14 to cover port 22. Thus my improved drainage valve not only prevents resilient plug 14 from being blown out from a pressure surge in the water line but it also provides a plug with sufficient resiliency to permit plug 14 to seal off the drainage valve under water pressures encountered during sprinkling conditions. While my resilient plug 14 is deformable it should be understood that under the operating conditions that for all practical purposes resilient plug 14 is nonextrudable. While the size of the drainage valves may vary I have found that with a drain passage diameter of .1 inch and a resilient plug that has a volume mass of 0.0065 cubic inches it provides sufficient mass to prevent extrusion of the resilient plug through the drain passage located in the support surface during the pressure surges encountered when shutting off the water supply. Since the shape of the resilient plug, the water pressure, the size of the drain passage and the material the resilient plug is made of have an effect on the mass necessary to prevent extrusion of the resilient plug through the passage one should select the minimum size of the plug through trial and error after the operating pressures and the size of the drain passage have been determined.

Referring to FIG. 4 there is shown an alternate embodiment 50 of underground drainage valve 10. Drainage valve 50 is similar to the underground drainage valve shown in my U.S. Pat. No. 3,779,276. Drainage valve 50 includes a resilient plug 51 with hemispherical nipples 52 that hold the head of the plug 51 off annular seat 59 when the pressure in the underground system has been shut off. Although resilient nipples are used non resilient nipples could be incorporated in the support surface with the resiliency of the plug providing the force to move the plug off the support surface when the water pressure is shut off.

The arrows indicate how the water flows around plug 51 when plug 51 is in the drain mode. In order to prevent blowout of the resilient plug 51, I provide a plug support member 53 having a central seat or support surface 56 to engage the more massive end 63 of plug 51. Located along the outer periphery of stop 53 are openings 55 that permit water to drain through pad 12. In the embodiment of FIG. 4 the location of support surface 56 in axial alignment with plug 51 converts plug 51 from an extrudable plug that could be blown out to a nonextrudable plug that can withstand the pressure surges encountered in normal operating conditions.

FIG. 5 illustrates how drain valve 50 operates to seal off passage 66 by providing a two surface support for resilient plug 51. In this embodiment support surface 56 provides partial support to resilient plug 51 in the region where plug 51 is more massive to ensure that plug 51 will not be blown out of drainage valve when a pressure line surge is encountered. That is, by partially supporting resilient plug 51 on annular support seat 67 and partially supporting resilient plug on support surfaces 56, I can provide sufficient support to prevent blowout of resilient plug 51 under field conditions of pressure line surges yet still permit plug 51 to have sufficient resiliency to seal under normal operating pressures found in residential water supply systems.

FIG. 6 illustrates member 53 with drain passages 55 and seat 56 for supporting end 63 of the resilient plug 51.

FIG. 7 shows a detail view of resilient plug 51 illustrating the resilient nipples 52, neck 60, and retaining end 65 which has end surface 63 that abuts against support surface 56. Resilient plug 51 and the resilient nipples 52 are known in the art and do not constitute a novel part of the invention.

Referring to FIG. 8 there is shown a further alternate embodiment 80 of my invention which uses a stepped cylindrical shaped resilient plug 81 to provide for automatic draining and sealing of drainage valve 80. Plug 81, like plugs 14 and 51, is made of a resilient material such as rubber or the like. Plug 81 has an upper cylindrical section 81 and an annular surface 82 with a set of resilient nipples 82 that hold plug 81 off upper annular seating surface 85 and lower annular seat or support surface 84 when the water pressure is off. FIG. 8 shows drainage valve 80 in the drain mode and illustrates with arrows how the water drains around resilient plug 81 when the water pressure has been shut off. FIG. 9 illustrates how plug 81 forms a two seat seal on annular support surface 82 and lower annular seat or support surface 84. The two seat sealing surfaces provide for sufficient support to prevent plug 81 from being blown out if the pressure line undergoes a pressure surge. Thus in the embodiments of FIG. 1 and FIG. 8 I prevent the resilient plug from being blown through the drain passage by placing the more massive portion of the resilient plug outside of the drain passage and provide a support surface around the drain port while in the embodiment of FIG. 4 I provide partial support for the resilient plug 51 on both sides of drain passage with support surface 56 preventing plug 51 from being forced through openings 55 in member 53.

FIGS. 10 through 13 show the preferred embodiment of my invention that uses a nonextrudable member made of a nondeformable material. The drainage valve 100 also incorporates symmetrical inserts that permit the rapid and error free assembly of my drainage valve.

FIG. 10 shows drainage valve 100 comprising a housing 101, a drain pad 105, a symmetrical annular resilient sealing member 102, a symmetrical nondeformable, nonextrudable member 103 and a symmetrical collar insert 104.

FIG. 13 shows in greater detail nonextrudable member 103 having a cylindrical center section 124 with a plurality of hemispherical shaped nipples 120 extending upward therefrom. Located in the center portion of section 124 are an upper and lower frustoconical projections 123 that have a sealing surface for sealing against sealing member 102. Sealing member 102 comprises a resilient annular member having a central opening 111 that fits in the lower portion of chamber 140. Since member 102 is symmetrical it can be inserted into chamber 140 without regard for which surface may be the top or bottom. This feature greatly enhances the ability to quickly assemble drainage valve 100. Located on top of sealing member 102 is nonextrudable member 103 which is made of a rigid polymer plastic. Located in the top portion of chamber 140 is symmetrical collar insert 104 that has a central inlet passage 131 and upper and lower frustoconcical surfaces 130 for mating with the frustoconical surfaces on member 103. Member 104 is also symmetrical to permit it to be installed in either direction in chamber 140. Thus, sealing member 102, nonextrudable member 103, and collar insert 104 are all symmetrical and permit an assembler to quickly assemble my drainage valve since one does not need to be concerned with the orientation of each individual member.

FIG. 11 illustrates my drainage valve in the nondrain mode with nonextrudable sealing member 103 forming a leakproof seal between sealing member 102 and housing 101. In the nondrain mode the nipples 120 are embedded in the resilient member 102 due to the high pressure water acting on the top of sealing member 102. In addition, the surface 123 engages corner 113 of sealing member 102 to complete the seal between member 102 and 103. As in the previously described embodiments, the resilient member 102 forces nipples 120 upward when the pressure is removed from inlet passage 131.

Thus in all the embodiments of my invention I prevent the nonextrudable member from being blown out of the drainage valve if pressure line surges should be encountered yet I still permit a portion of a resilient member to resiliently deform under normal line pressures to seal off the drain ports. In addition, by retaining a resilient member I provide for automatic unsealing of the drain ports when the pressure in the water line is shut off.

Referring to FIG. 14 there is shown an alternate embodiment 150 of my invention that uses a plug 151 formed with a hard disc 154 and a cylindrical stem 156 with a resilient ring 158 located on stem 156 to hold plug 151 in housing 153. The embodiment of FIG. 14 is similar in operation to the embodiment of FIG. 11 except that the embodiment of FIG. 14 can only be inserted for operation in one direction. FIG. 15 shows plug 151 with stem 156 having a circular groove 157 to permit one to hold the sealing ring 158 around stem 156. Since plug 151 is made of a hard material such as polymer plastic it can not be extruded through the opening 160 in housing 153. The resilient sealing ring 158 on the stem 156 permits the valve to seal itself against backflow without the need for a top resilient washer as shown in FIG. 12.

Figure 17:
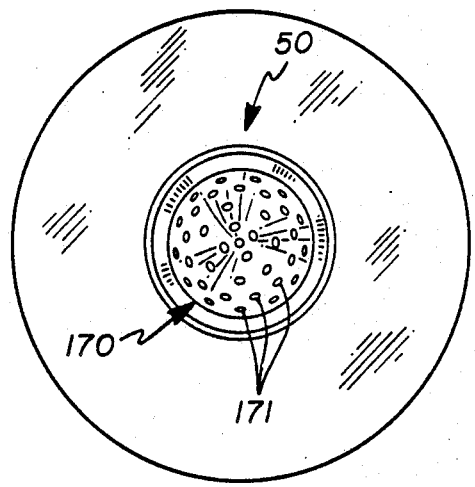
FIG. 17 shows a top view of the embodiment of FIG. 16.

Referring to FIG. 16 and 17 the drain valve 50 of FIG. 5 is shown with a domed screen 170 that contains multiple openings 171 that are sufficiently small to keep out dirt and other contaminant particles that may affect the operation of the valve. In the embodiment shown the domed screen is made of a polymer plastic and is secured to the top of valve 50 which is also made of a polymer plastic through such methods as heat sealing or adhesive bonding.

Figure 18:
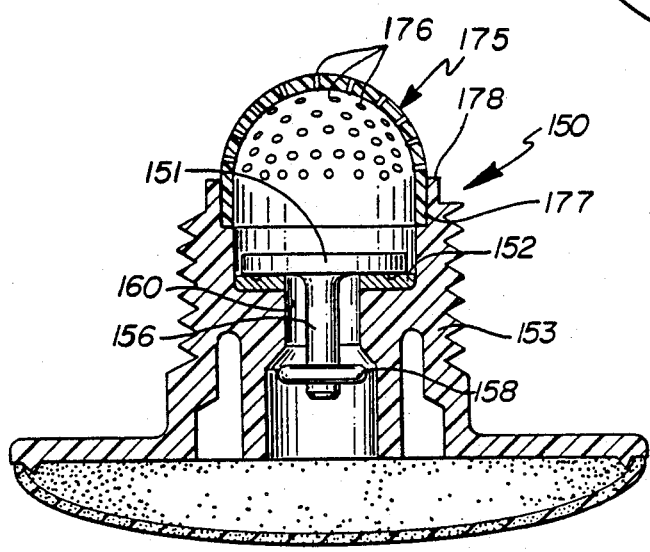
FIG. 18 shows a side section of the embodiment of FIG. 14 with a domed screen over the inlet.

FIG. 18 shows the embodiment of FIG. 14 with a similar domed screen 175 located in valve 150 through the press fitting of the bottom 177 of domed screen 150 into an annular opening in the top of valve 150. In both the embodiments using the domed screen the openings in the screen are sufficiently small to permit dirt or other contaminant particles from flowing through the screen and interfering with the operation of the drain valve, yet are sufficiently large to permit water to flow through the domed screen to permit the automatic draining of the valve and associated pipe lines.

While my drainage valve is shown in use for underground watering systems my drainage valve can also be used as a flush valve at the end of an underground watering system. Other applications of my drainage valve are as a boat drain valve, an air compressor drain valve or as a drain valve for heating and cooling condensers.

I claim:

1. A drainage valve for underground water systems that can withstand pressure surges produced by opening and closing the water supply yet still permit the drainage valve to close under normal water line pressures and to open when the water pressure is shut off to permit drainage of the underground water system when the underground water system is not in use and to close when the underground water system during use of the underground water system comprising:

a housing for attachment to an underground water system, said housing having an inlet for attachment to an underground water line and an outlet for draining water into the soil surrounding said housing;

a support surface for supporting a resilient plug to prevent blowout of said resilient plug from said drainage valve;

a drain passage located in said housing to permit water to drain into said outlet; and a resilient plug for opening and closing said drain passage, said resilient plug having resilient means to hold said resilient plug in a spaced position from said supporting surface to permit water to drain from said drain passage when the water pressure is shut off to said underground water system, said resilient plug having a nonextrudable portion proximate said support surface to being blown out of said drainage valve if pressure line surges are encountered.

2. The drainage valve of claim 1 including a second surface that comprises an annular support surface for supporting said resilient plug.

3. The drainage valve of claim 2 wherein said resilient plug includes a first annular member for seating and sealing on said support surface and a second annular member for seating and sealing on said second surface.

4. The drainage valve of claim 2 wherein said second surface is located downstream of said drain passage and said resilient plug extends partially through said drain passage.

5. The drainage valve of claim 1 wherein said support surface comprises an annular support surface for supporting a portion of said resilient plug.

6. The drainage valve of claim 1 wherein said resilient plug has sufficient mass so as preclude forcing said resilient plug through said drain passage when said drainage valve is subject to pressure surges in said underground water system.

7. The drainage valve of claim 1 wherein said resilient plug has a concave bottom that forms a seal over said drain passage.

8. The drainage valve of claim 1 wherein said resilient plug has a guide surface for engaging said housing to retain said resilient plug in axial alignment with said drain passage.

9. The drainage valve of claim 1 including a screen located on said drainage valve to keep particles from entering said drainage valve.

10. The drainage valve of claim 9 wherein said screen is made of a polymer plastic.

11. The drainage valve of claim 1 including a domed screen located on said housing to prevent dirt and other contaminants from flowing through said screen yet permitting water to flow through said screen.

12. A drainage valve for use in pressure systems where pressure surges occur for draining an underground water system when the water pressure in the underground water system if off and for sealing the drainage valve against drainage when the water pressure is on comprising:

a housing having a first annular support and sealing surface and a second annular support and sealing surface for supporting a resilient plug, said housing including a drain passage to drain said valve; and a resilient plug, said resilient plug having a nonextrudable portion and a first surface and a second surface for forming sealing and supporting engagement with said housing to permit said resilient plug to seal the drain passage when the water pressure is on and to permit said resilient plug to open said drain passage when the water pressure is off.

13. The drainage valve of claim 12 wherein said resilient plug has a massive portion proximate said support surface to prevent said resilient plug from being blown through said drainage valve during pressure surges in the underground water system.

14. The drainage valve of claim 13 wherein said resilient plug includes a first annular surface for engaging said first surface and a second annular surface for engaging said second surface.

15. A drainage valve for use in pressure systems where pressure surges occur for draining an underground water system when the water pressure in the underground water system is off and for sealing the drainage valve against drainage when the water pressure is on comprising:

a housing having a first annular support and sealing surface and a second annular support and sealing surface for supporting a member that is nonextrudable through a drain passage in said drainage valve under normal operating pressures and surge pressures encountered in water supply system, said housing including a drain passage to drain said valve; and said nonextrudable member having a first surface and a second surface for forming sealing and supporting engagement with said housing to permit said nonextrudable member to seal the drain passage when the water pressure is on and to permit said nonextrudable member to open said drain passage when the water pressure is off.

16. The drainage valve of claim 15 wherein said nonextrudable member is formed of resilient material.

17. The drainage valve of claim 15 wherein said nonextrudable member is made of a polymer plastic.

18. The drainage valve of claim 17 includes a symmetrical nonextrudable member, a symmetrical sealing member and a symmetrical collar insert each having identical top surfaces and bottom surfaces to permit insertion of each of said members in a drainage valve housing without regard to which surface is the top surface or the bottom surface.

19. The drainage valve of claim 15 including a screen located on said drainage valve to keep particles from entering said drainage valve.

20. A drainage valve for use in systems where pressure surges occur for draining the system when the fluid pressure in the system is off and for sealing the drainage valve against drainage when the fluid pressure is on comprising:

a housing having a first annular support and sealing surface and a second annular and sealing surface for supporting a resilient plug, said housing including a drain passage to drain said valve; and a resilient plug, said resilient plug having nonextrudable portion and a first surface and a second surface for forming sealing and supporting engagement with said housing to permit said resilient plug to seal the drain passage when the fluid pressure is on and to permit said resilient plug to open said drain passage when the fluid pressure is off.

* * * * *